No Printed Specification Available
5315X
W. Woodworth,
Planing and Matching Machine,
Patented Dec. 27, 1828.
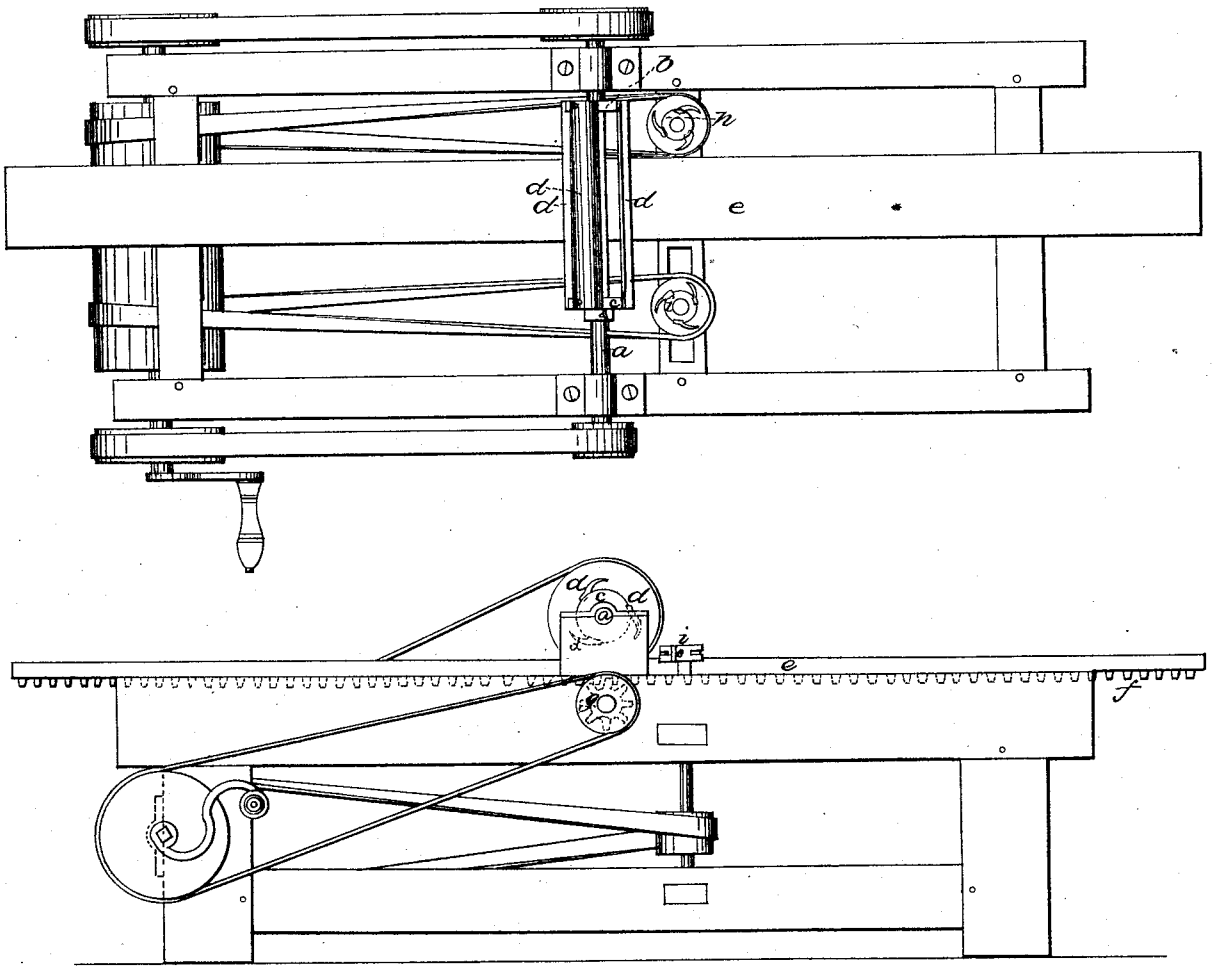
AM. PHOTO-LITHO. CO. N.Y. (OSBORNE'S PROCESS.)

William Woodworth's Planing Machine

Patented Decr 27th 1828.

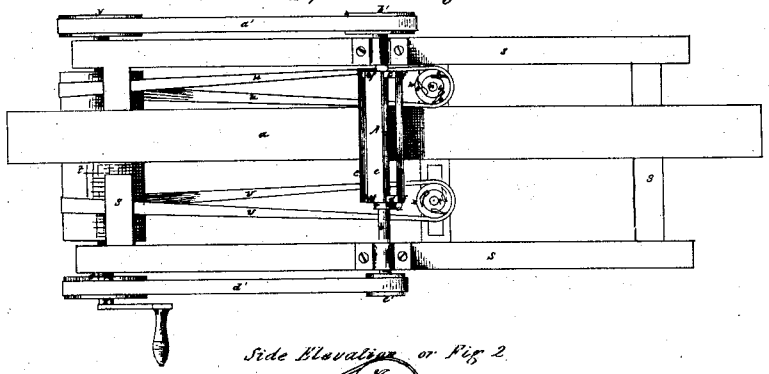

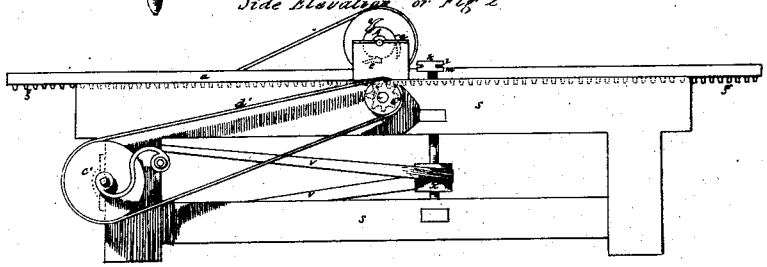

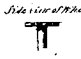

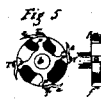

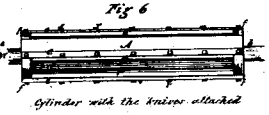

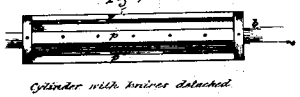

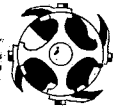

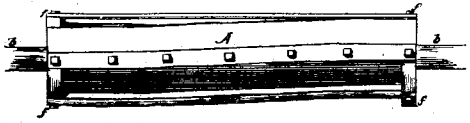

References.

a The carriage on which the plank, board, or other material is placed.

A. Rotary cutting wheel, or cylinder of knives: or planing and reducing wheel.

b. Axis or horizontal shaft of the Rotary cutting wheel.

c. Stationary or fixed head of cylinder knives.

d. Moveable head, which may be adjusted on the shaft, and confined by a screw d', or any suitable contrivance, to accommodate any length of knife or knives required.

e. e. e. The knives, cutters, or planes.

f. f. f. Screws which confine the knives e. e. to the heads c. d. of the cylinder A.

The knives e. e. e. in the top view and side elevation are each represented as in a line with the axis or shaft of the cylinder: by which is meant, practically speaking, that they are in a parallel line with said axis. In Figure 3, the knives are represented as diagonal with said axis; that is to say: while the edges of said knives are situated in the circumference of a cylinder, they at the same time, form helical or spiral lines longitudinally thereon, as seen in the figure.

g. Rack attached to the underside of the carriage.

h. Pinion which operates in the rack g, and moves the carriage back and forth under the cylinder; or to the knives or cutters; or the periphery of the same.

i. The revolving cutter wheel for forming the groove in the edge of the board.

k. The revolving cutter wheel for cutting the rabates which form the tongue, the revolving wheel being composed of two wheels, or sets of cutters l. m. one of which is placed directly over the other, at the width of the tongue apart.

n. Axis (or shaft) of the grooving wheel.

o. o. Cutters of the grooving wheel.

p. p. See Figs 4, 5, 6. Lugs connecting the heads of the cylinder, and to which the knives may be attached by screws or bolts r. r. r.

S. The wooden framework which supports the working parts of the machinery.

t. Driving drum, from which belts u. v. pass to and around their respective pullies w. x. on the upright shafts of the grooving and rebating wheels.

y. Pulley on the axis or shaft z, of the driving drum, from which motion is communicated to the cylinder, by a belt a', passing from the same, to and around a pulley b' on the cylinder shaft.

c'. Pulley on the driving drum shaft.

d'. Belt passing from ditto, to a pulley e' on the pinion shaft, for the purpose of operating the carriage.

Drawings from Office of R. H. Eddy, Engineer, Boston.

State of Massachusetts }
County of Suffolk, ss. }

On this second day of October A.D. 1841, personally appeared before me, Richard Crann, of Boston, in the State of Massachusetts, and made solemn oath that he is interested, as an assignee, in a Planing Machine, for which Letters Patent of the United States were granted to William Woodworth, on the twenty seventh day of December, A.D. 1828, and that the accompanying drawings are, as he verily believes, a true delineation of the invention described in the said Letters Patent.

R. H. Eddy, Justice of Peace.

Patent Office

Restored by R. H. Eddy and received at the Office by me Oct. 11th 1841.
[illegible] Clk. P. Off.

5315X